United States Patent
Yasuhiko et al.

(10) Patent No.: US 12,510,458 B2
(45) Date of Patent: Dec. 30, 2025

(54) OBSERVATION DEVICE AND OBSERVATION METHOD USING A LOW-SPEED CAMERA AS AN IMAGING UNIT WHEN OBSERVING A MOVING OBSERVATION OBJECT

(71) Applicant: HAMAMATSU PHOTONICS K.K., Hamamatsu (JP)

(72) Inventors: Osamu Yasuhiko, Hamamatsu (JP); Hidenao Yamada, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 494 days.

(21) Appl. No.: 18/008,490

(22) PCT Filed: May 26, 2021

(86) PCT No.: PCT/JP2021/020020
§ 371 (c)(1),
(2) Date: Dec. 6, 2022

(87) PCT Pub. No.: WO2021/256202
PCT Pub. Date: Dec. 23, 2021

(65) Prior Publication Data
US 2023/0213432 A1 Jul. 6, 2023

(30) Foreign Application Priority Data
Jun. 18, 2020 (JP) .................. 2020-105338

(51) Int. Cl.
*G01N 15/1429* (2024.01)
*G01N 15/1434* (2024.01)
*G01N 15/10* (2006.01)

(52) U.S. Cl.
CPC ..... *G01N 15/1429* (2013.01); *G01N 15/1436* (2013.01); *G01N 2015/1006* (2013.01)

(58) Field of Classification Search
CPC .......... G01N 15/1429; G01N 15/1436; G01N 2015/1006; G01N 15/1434;
(Continued)

(56) References Cited

U.S. PATENT DOCUMENTS 9,411,146 B2  8/2016  Iwai
9,851,243 B2  12/2017  Rembe et al.
(Continued)

FOREIGN PATENT DOCUMENTS

EP  3855252 A1 * 7/2021  ......... G01N 15/1475
EP  4451696 A1 * 10/2024  ............... G01J 9/02
(Continued)

OTHER PUBLICATIONS

Yoonseok Baeii et al., "Kramers-Kronig holographic imaging for high-space-bandwidth product:supplementary material", Optica, vol. 6, No. 1, Jan. 7, 2019, p. 1-p. 7, XP093164681.
(Continued)

*Primary Examiner* — Michael A Lyons
*Assistant Examiner* — Maher Yazback
(74) *Attorney, Agent, or Firm* — Faegre Drinker Biddle & Reath LLP

(57) ABSTRACT

An observation apparatus includes a light source unit, an irradiation optical system, an imaging optical system, a modulation unit, an imaging unit, an analysis unit, beam splitters and, and mirrors. The analysis unit obtains a real part of a function $\chi(t)=\log[1+U_{obj}(t)/U_{ref}(t)]$, defined by time series data $U_{obj}(t)$ of a complex amplitude image of object light on an imaging plane and time series data $U_{ref}(t)$ of a complex amplitude image of reference light on the imaging plane, based on time series data $I(t)$ of an intensity image of interference light on the imaging plane and time series data $I_{ref}(t)$ of an intensity image of the reference light on the imaging plane. Further, the analysis unit obtains an
(Continued)

imaginary part of $\chi(t)$ from the real part of $\chi(t)$ using the Kramers-Kronig relations, and further obtains $U_{obj}(t)$.

10 Claims, 14 Drawing Sheets

(58) Field of Classification Search
CPC ....... G01N 15/1459; G01N 2015/1454; G02B 21/14; G02B 21/36
See application file for complete search history.

(56) References Cited

U.S. PATENT DOCUMENTS

| | | | |
|---|---|---|---|
| 2005/0046858 A1* | 3/2005 | Hanson | G03H 1/0866 356/457 |
| 2009/0046296 A1* | 2/2009 | Kilpatrick | G01H 9/004 356/484 |
| 2009/0323061 A1* | 12/2009 | Novotny | G01N 15/1456 977/773 |
| 2013/0063729 A1* | 3/2013 | Iwai | G03H 1/0443 356/486 |
| 2014/0041456 A1 | 2/2014 | Rembe et al. | |
| 2014/0243614 A1 | 8/2014 | Rothberg et al. | |
| 2014/0340503 A1 | 11/2014 | Iwai | |

FOREIGN PATENT DOCUMENTS

| | | |
|---|---|---|
| JP | 2002-519690 A | 7/2002 |
| JP | 2011-099781 A | 5/2011 |
| JP | 2013-096918 A | 5/2013 |
| JP | 6052965 B2 | 12/2016 |
| JP | 2019-041724 A | 3/2019 |
| JP | 2020-086204 A | 6/2020 |
| WO | WO-00/002023 A1 | 1/2000 |
| WO | WO-2011/136381 A1 | 11/2011 |
| WO | WO-2013/065796 A1 | 5/2013 |

OTHER PUBLICATIONS

Cheng Shen et al., "Non-iterative complex wave-field reconstruction based on Kramers-Kronig relations", a.rxiv.org, Cornell University Library, 201 Olin Library Cornell University Ithaca,NY 14853, May 11, 2020, p. 1-p. 7, XP081989005.
Baek, Y., et al., "Kramers-Kronig holographic imaging for high-space-bandwidth product," Optica, vol. 6, No. 1, 2019, pp. 45-51.
Iwai, H., et al., "Doppler-spectrally encoded imaging of translational objects," Optics Communications, vol. 319, 2014, pp. 159-169.
International Preliminary Report on Patentability mailed Dec. 29, 2022 for PCT/JP2021/020020.

* cited by examiner

EXACT SOLUTION

OBSERVATION DEVICE AND OBSERVATION METHOD USING A LOW-SPEED CAMERA AS AN IMAGING UNIT WHEN OBSERVING A MOVING OBSERVATION OBJECT

TECHNICAL FIELD

The present disclosure relates to an observation apparatus and an observation method.

BACKGROUND ART

An observation apparatus described in Patent Document 1 and Non Patent Document 1 splits light output from a light source into object light and reference light, combines the object light passed through a moving observation object and the reference light having an optical frequency shifted by a heterodyne frequency, and causes heterodyne interference between the object light and the reference light. Further, the observation apparatus can acquire time series data of a complex amplitude image of the object light on an imaging plane based on time series data of an intensity image of interference light reaching the imaging plane of a camera.

The above observation apparatus needs to use a camera having a higher frame rate as the observation object moves faster. For example, the above observation apparatus is used when observing a cell (observation object) flowing at a speed of several m/sec along a flow path in a flow cytometer, and in this case, it is desirable to use a high-speed camera having a frame rate exceeding 100 kfps.

CITATION LIST

Patent Literature

Patent Document 1: International Publication No. 2013/065796

Non Patent Literature

Non Patent Document 1: H. Iwai, T. Yamauchi, M. Miwa, Y. Yamashita, "Doppler-spectrally encoded imaging of translational objects", Optics Communications, Vol. 319, pp. 159-169 (2014)

Non Patent Document 2: Y. Baek, K. Lee, S. Shin, Y. Park, "Kramers-Kronig holographic imaging for high-space-bandwidth product", Optica, Vol. 6 No. 1, pp. 45-51 (2019)

SUMMARY OF INVENTION

Technical Problem

However, when the high-speed camera is used, image data obtained by imaging becomes enormous, a capacity of a storage unit for storing data also becomes large, and a load of data processing also becomes large. Further, the high-speed camera is expensive.

In addition, Non Patent Document 2 describes a technique capable of acquiring a phase image equivalent to a conventional one even when a spatial sampling period is increased (that is, when a pixel pitch in the imaging plane of the camera is increased). However, the above technique cannot lower the frame rate of the camera when observing the moving observation object.

An object of an embodiment is to provide an observation apparatus and an observation method capable of using a low-speed camera as an imaging unit when observing a moving observation object.

Solution to Problem

An embodiment is an observation apparatus. The observation apparatus includes (1) a light source for outputting light; (2) an interference optical system for splitting the light output from the light source into object light and reference light, and combining and outputting the object light passed through a moving observation object and the reference light; (3) a modulation unit provided on an optical path of the object light or the reference light from splitting to combining in the interference optical system, and for shifting an optical frequency of the object light or the reference light by a heterodyne frequency $f_0$; (4) an imaging unit having an imaging plane disposed at a position where an image of the observation object is formed by the object light output from the interference optical system, and for acquiring an intensity image of interference light by the object light and the reference light output from the interference optical system and reaching the imaging plane; and (5) an analysis unit for obtaining time series data of a complex amplitude image of the object light on the imaging plane based on time series data of the intensity image of the interference light on the imaging plane, and when a maximum value of a Doppler shift amount of the optical frequency based on interaction with the observation object in the object light reaching the imaging plane is set to $\Delta f_{max}$, the modulation unit sets the heterodyne frequency $f_0$ to $\Delta f_{max}$ or more, and the analysis unit (a) obtains a real part of a function $\chi(t)=\log[1+U_{obj}(t)/U_{ref}(t)]$, defined by time series data $U_{obj}(t)$ of the complex amplitude image of the object light on the imaging plane and time series data $U_{ref}(t)$ of the complex amplitude image of the reference light on the imaging plane, based on time series data $I(t)$ of the intensity image of the interference light on the imaging plane and time series data $I_{ref}(t)$ of the intensity image of the reference light on the imaging plane, (b) obtains an imaginary part of the function $\chi(t)$ from the real part of the function $\chi(t)$ using Kramers-Kronig relations, and (c) obtains the time series data $U_{obj}(t)$ of the complex amplitude image of the object light on the imaging plane based on the function $\chi(t)$.

An embodiment is an observation method. The observation method uses the light source; the interference optical system; the modulation unit; and the imaging unit of the above configuration, and the method includes (a) when a maximum value of a Doppler shift amount of the optical frequency based on interaction with the observation object in the object light reaching the imaging plane is set to $\Delta f_{max}$, setting the heterodyne frequency $f_0$ to $\Delta f_{max}$ or more by the modulation unit, and obtaining time series data of the intensity image of the interference light on the imaging plane by the imaging unit; (b) obtaining a real part of a function $\chi(t)=\log[1+U_{obj}(t)/U_{ref}(t)]$, defined by time series data $U_{obj}(t)$ of the complex amplitude image of the object light on the imaging plane and time series data $U_{ref}(t)$ of the complex amplitude image of the reference light on the imaging plane, based on time series data $I(t)$ of the intensity image of the interference light on the imaging plane and time series data $I_{ref}(t)$ of the intensity image of the reference light on the imaging plane; (c) obtaining an imaginary part of the function $\chi(t)$ from the real part of the function $\chi(t)$ using Kramers-Kronig relations; and (d) obtaining the time series data $U_{obj}(t)$ of the complex amplitude image of the object light on the imaging plane based on the function $\chi(t)$.

Advantageous Effects of Invention

According to the observation apparatus and the observation method of the embodiments, it is possible to use a low-speed camera as an imaging unit when observing a moving observation object.

DESCRIPTION OF EMBODIMENTS

Hereinafter, embodiments of an observation apparatus and an observation method will be described in detail with reference to the accompanying drawings. In the description of the drawings, the same elements will be denoted by the same reference signs, and redundant description will be omitted. The present invention is not limited to these examples.

Figure 1:
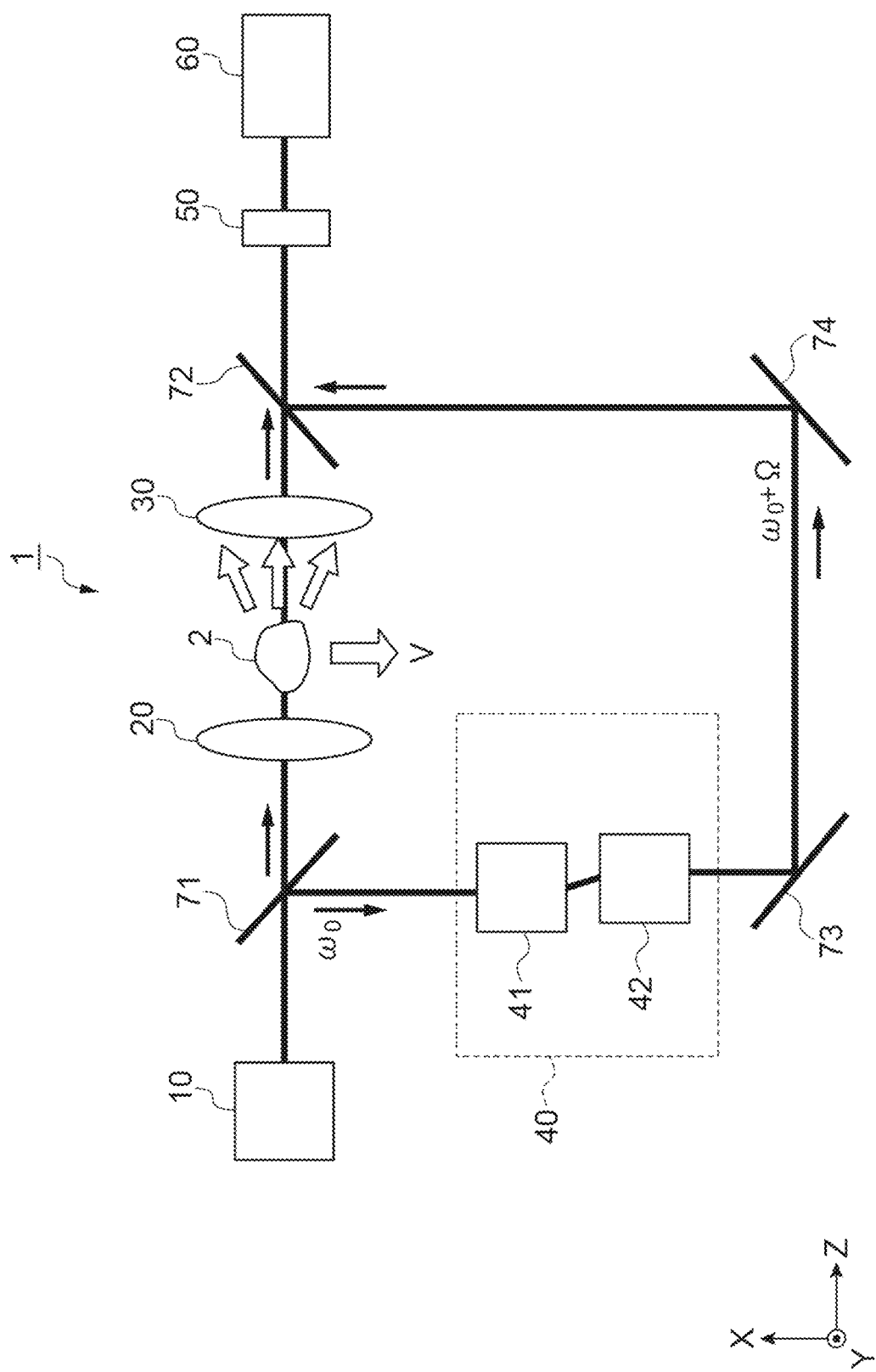
FIG. 1 is a diagram illustrating a configuration of an observation apparatus 1.

FIG. 1 is a diagram illustrating a configuration of an observation apparatus 1. The observation apparatus 1 includes a light source unit 10, an irradiation optical system 20, an imaging optical system 30, a modulation unit 40, an imaging unit 50, an analysis unit 60, beam splitters 71, 72, and mirrors 73, 74. The components arranged on an optical path from the light source unit 10 to the imaging unit 50 are optically coupled to each other. The imaging unit 50 and the analysis unit 60 are electrically coupled to each other.

The observation apparatus 1 can be suitably used, for example, when observing a cell (observation object 2) flowing in one direction along a flow path in a flow cytometer. The observation object 2 is moving in a space between the irradiation optical system 20 and the imaging optical system 30.

Hereinafter, as illustrated in the diagram, the observation apparatus 1 will be described by using an xyz orthogonal coordinate system. The z axis is set in a direction parallel to an optical axis of the irradiation optical system 20 and the imaging optical system 30. It is assumed that the observation object 2 moves in one direction perpendicular to the z axis, and the x axis is set in a direction parallel to the moving direction. The y axis is set in a direction perpendicular to both the x axis and the z axis.

The light source unit 10 outputs light with which the observation object 2 is irradiated. The light source unit 10 outputs temporally and spatially coherent light, and includes, for example, a He—Ne laser light source. It is preferable that the light source unit 10 includes a beam expander, and outputs collimated light whose beam diameter is increased by the beam expander.

The beam splitter 71 is optically coupled to the light source unit 10. The beam splitter 71 splits the light reaching from the light source unit 10 into two light beams, outputs one split light as object light to the irradiation optical system 20, and outputs the other split light as reference light to the modulation unit 40.

The irradiation optical system 20 is optically coupled to the beam splitter 71. The irradiation optical system 20 receives the object light reaching from the beam splitter 71, and irradiates the observation object 2 with the object light.

The imaging optical system 30 receives light (transmitted light, scattered light, or the like) generated in the observation object 2 by the object light irradiation onto the observation object 2 by the irradiation optical system 20, and forms an image of the observation object 2 on an imaging plane of the imaging unit 50 by the received object light.

The modulation unit 40 is optically coupled to the beam splitter 71. The modulation unit 40 receives the reference light reaching from the beam splitter 71, and shifts an optical frequency of the reference light by a heterodyne frequency $f_0$.

The modulation unit 40 may include, for example, a first acousto-optic element 41 and a second acousto-optic element 42. The first acousto-optic element 41 diffracts the reference light reaching from the beam splitter 71 by a first modulation signal, and outputs the diffracted reference light to the second acousto-optic element 42.

The second acousto-optic element 42 diffracts the reference light reaching from the first acousto-optic element 41 by a second modulation signal, and outputs the diffracted reference light to the mirror 73. The reference light output from the second acousto-optic element 42 is sequentially reflected by the mirror 73 and the mirror 74, and reaches the beam splitter 72.

A frequency of the first modulation signal provided to the first acousto-optic element 41 and a frequency of the second modulation signal provided to the second acousto-optic element 42 are slightly different from each other. For example, the frequency of the first modulation signal is set to 40 MHz, the frequency of the second modulation signal is set to 40.040 MHz, and a difference between them is 40 kHz. Each of the first modulation signal and the second modulation signal is a sinusoidal wave.

In addition, the modulation unit 40 is not necessarily configured by two elements of the first acousto-optic element 41 and the second acousto-optic element 42. That is, the modulation unit 40 may have a function of shifting the optical frequency of the reference light by the predetermined heterodyne frequency, and the modulation unit 40 may include one modulation element, or may include three or more modulation elements. Further, the modulation unit 40 may be disposed on the optical path of the object light, and may shift the optical frequency of the object light by the heterodyne frequency.

The beam splitter 72 is optically coupled to the imaging optical system 30, and receives the object light reaching from the imaging optical system 30. Further, the beam splitter 72 is optically coupled to the mirror 74, and receives the reference light reaching from the mirror 74. The beam splitter 72 combines the received object light and the reference light, outputs the combined light on the same axis, and causes heterodyne interference of the light beams to generate interference light. The optical system from the beam splitter 71 to the beam splitter 72 constitutes an interference optical system.

The imaging unit 50 is optically coupled to the beam splitter 72. The imaging unit 50 receives the interference light generated by the object light and the reference light output and reaching from the beam splitter 72. The imaging plane of the imaging unit 50 is disposed at a position where an image of the observation object 2 is formed by the object light output and reaching from the imaging optical system 30. The image formed here may be a real image of the observation object 2, or a Fourier transform image thereof. The imaging unit 50 acquires an intensity image of the interference light by the object light and the reference light output from the beam splitter 72 and reaching the imaging plane.

The analysis unit 60 is electrically coupled to the imaging unit 50. The analysis unit 60 inputs data of the intensity image of the interference light acquired by the imaging unit 50. The analysis unit 60 obtains time series data of a complex amplitude image of the object light on the imaging plane on the basis of time series data of the intensity image of the interference light on the imaging plane of the imaging unit 50.

The analysis unit 60 includes an input unit for inputting the data of the intensity image of the interference light from the imaging unit 50, a storage unit (for example, hard disk drive, RAM, and the like) for storing the input data of the intensity image of the interference light, the data of the complex amplitude image of processing results, and the like, an operation unit (for example, CPU, DSP, FPGA, and the like) for processing the data, and a display unit (for example, liquid crystal display and the like) for displaying the intensity image of the interference light, the complex amplitude image of the processing results, and the like. The analysis unit 60 is, for example, a computer, a smart device, or a cloud computing.

Figure 2:
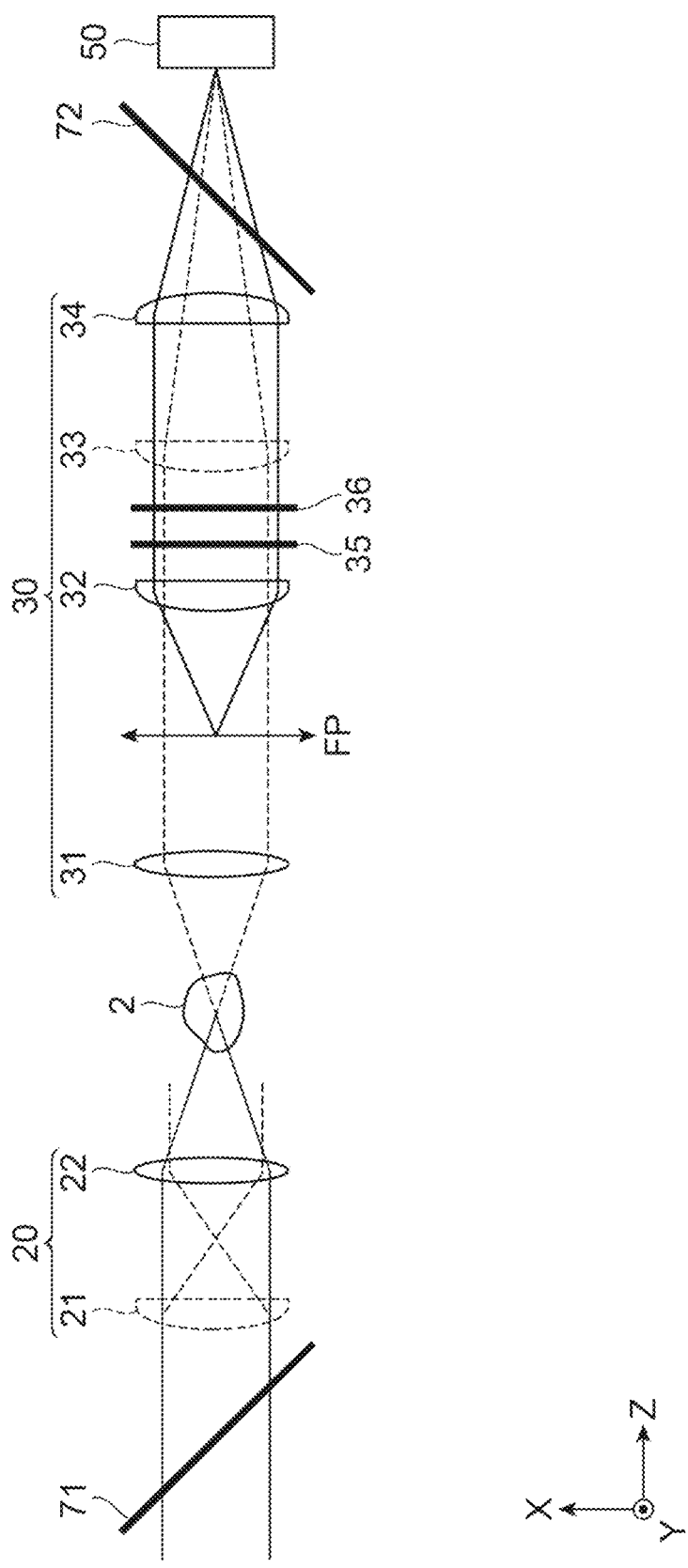
FIG. 2 is a diagram illustrating a configuration example of an irradiation optical system 20 and an imaging optical system 30 of the observation apparatus 1.

FIG. 2 is a diagram illustrating a configuration example of the irradiation optical system 20 and the imaging optical system 30 of the observation apparatus 1. In this diagram, the action of convergence or collimation of the object light by each lens constituting the irradiation optical system 20 or the imaging optical system 30 is illustrated by a dashed line when viewed in the y axis direction, and illustrated by a solid line when viewed in the x axis direction.

The irradiation optical system 20 includes lenses 21 and 22. In these lenses, the lens 21 is a cylindrical lens. A rear focal point of the lens 21 coincides with a front focal point of the lens 22. A rear focal point of the lens 22 is located at a position through which the observation object 2 passes.

When viewed in the y axis direction, as indicated by the dashed line, the object light output from the beam splitter 71 is converged by the lens 21, and then input to the lens 22 as diverging light, and collimated by the lens 22. When viewed in the x axis direction, as indicated by the solid line, the object light output from the beam splitter 71 is input to the lens 22 without being converged or diverged by the lens 21, and converged by the lens 22.

Thus, the irradiation optical system 20 can focus the object light and irradiate a line-shaped region in the direction (y axis direction) perpendicular to the moving direction (x axis direction) of the observation object 2 with the object light. That is, the irradiation optical system 20 can simultaneously irradiate the observation object 2 with the object light from various directions (multiple directions).

The imaging optical system 30 includes lenses 31 to 34. In these lenses, each of the lenses 32 to 34 is a cylindrical lens. A front focal point of the lens 31 is located at a position through which the observation object 2 passes. A rear focal point of the lens 31 is located on a plane FP. The plane FP is a plane on which the Fourier transform image of the observation object 2 is formed by the lens 31.

A front focal point of the lens 32 is located on the plane FP. A rear focal point of the lens 32 is located at the position of the lens 33. A front focal point of the lens 33 is located on the plane FP. A rear focal point of the lens 33 is located on the imaging plane of the imaging unit 50. A front focal point of the lens 34 is located at the position of the lens 33. A rear focal point of the lens 34 is located on the imaging plane of the imaging unit 50.

When viewed in the y axis direction, as indicated by the dashed line, the object light emitted from the observation object 2 is collimated by the lens 31, and converged by the lens 33. When viewed in the x axis direction, as indicated by the solid line, the object light emitted from the Fourier transform plane FP is collimated by the lens 32, and converged by the lens 34.

Thus, the imaging optical system 30 can set the observation object 2 and the imaging plane of the imaging unit 50 in a positional relationship of Fourier transform in the direction (x axis direction) parallel to the moving direction of the observation object 2, and further, can set the observation object 2 and the imaging plane of the imaging unit 50 in a positional relationship conjugate to each other in the direction (y axis direction) perpendicular to the moving direction of the observation object 2.

When the irradiation optical system 20 and the imaging optical system 30 have the above configurations, the analysis unit 60 can obtain the time series data of the complex amplitude image of the object light on the imaging plane. The complex amplitude image obtained here is the Fourier transform image in the x axis direction and the real image in the y axis direction.

Further, the analysis unit 60 can obtain the complex amplitude image (real image) for each irradiation direction of the object light to the observation object 2 by the irradiation optical system 20 by performing processing such as Fourier transform on the time series data of the intensity image of the interference light acquired by the imaging unit 50, and can acquire a three-dimensional distribution of a refractive index of the observation object 2 (see Patent Document 1 and Non Patent Document 1).

In addition, FIG. 2 also illustrates a neutral density filter 35 inserted on the optical path of the object light and a shield 36 which can be inserted on the optical path of the object light. The neutral density filter 35 is an element for adjusting the intensity of the object light reaching the imaging plane of the imaging unit 50. The shield 36 is an element for preventing the object light from entering the imaging plane of the imaging unit 50 when it is inserted on the optical path. When the intensity image of the interference light is acquired by the imaging unit 50, the shield 36 is removed from the optical path of the object light. These functions will be described later.

In the observation apparatus 1 described above, a moving speed of the observation object 2 is set to V, a wavenumber component in the x axis direction of the object light before interacting with the observation object 2 is set to $k_x^{in}$, and a wavenumber component in the x axis direction of the object light after interacting with the observation object 2 is set to $k_x^{out}$. In this case, a Doppler shift amount $\Delta f$ of the optical frequency of the object light generated by the interaction with the observation object 2 is represented by the following Formula (1).

[Formula 1]

$$\Delta f = (k_x^{out} - k_x^{in}) \cdot \frac{V}{2\pi} \quad (1)$$

A numerical aperture of the lens 22 at the final stage of the irradiation optical system 20 is set to $NA_{in}$, a numerical aperture of the lens 31 at the first stage of the imaging optical system 30 is set to $NA_{out}$, and a wavelength of the light is set to $\lambda$. In this case, a maximum value $\Delta f_{max}$ of the Doppler shift amount $\Delta f$ is represented by the following Formula (2), and a minimum value $\Delta f_{min}$ of the Doppler shift amount $\Delta f$ is represented by the following Formula (3). Therefore, the Doppler shift amount $\Delta f$ of the optical frequency of the object light reaching the imaging plane of the imaging unit 50 is distributed in a range of $[-\Delta f_{max}, \Delta f_{max}]$.

[Formula 2]

$$\Delta f_{max} = (NA_{in} + NA_{out}) \cdot \frac{V}{\lambda} \quad (2)$$

[Formula 3]

$$\Delta f_{min} = -(NA_{in} + NA_{out}) \cdot \frac{V}{\lambda} = -\Delta f_{max} \quad (3)$$

The time series data of the complex amplitude image of the object light on the imaging plane of the imaging unit 50 is set to $U_{obj}(t)$. The time series data of the complex amplitude image of the reference light on the imaging plane of the imaging unit 50 is set to $U_{ref}(t)$. $U_{ref}(t)$ is represented as follows using the heterodyne frequency $f_0$.

$$U_{ref}(t) = U_0 \cdot \exp(-i2\pi f_0 t)$$

The time series data I(t) of the intensity image of the interference light acquired by the imaging unit 50 is represented by the following Formula (4) and Formula (5) (Formulas (5a) to (5d)). In addition, i is an imaginary unit, π is a circular constant, and t is a time variable. The notation of a variable representing a position in each image is omitted.

[Formula 4]

$$I(t) = |U_{obj}(t) + U_{ref}(t)|^2 \quad (4)$$
$$= I_{obj}(t) + I_{ref}(t) + I_{cross}(t) + I_{cross}^*(t)$$

[Formula 5]

$$I_{obj}(t) = |U_{obj}(t)|^2 \quad (5a)$$

$$I_{ref}(t) = |U_{ref}(t)|^2 \quad (5b)$$

-continued $$I_{cross}(t) = U_{obj}^*(t) \cdot U_{ref}(t) \quad (5c)$$

$$I_{cross}^*(t) = U_{obj}(t) \cdot U_{ref}^*(t) \quad (5d)$$

$I_{obj}(t)$ (Formula (5a)) includes frequency components in a range of $[-2\Delta f_{max}, 2\Delta f_{max}]$. $I_{ref}(t)$ (Formula (5b)) includes only DC components when $U_0$ does not change with time. $I_{cross}(t)$ (Formula (5c)) includes frequency components in a range of $[-\Delta f_{max}+f_0, \Delta f_{max}+f_0]$. $I_{cross}^*(t)$ (Formula (5d)) includes frequency components in a range of $[-\Delta f_{max}-f_0, \Delta f_{max}-f_0]$.

When the frequency range of $I_{cross}(t)$ or $I_{cross}^*(t)$ does not overlap with the frequency range of $I_{obj}(t)$, the time series data of $I_{cross}(t)$ or $I_{cross}^*(t)$ can be measured. Further, the time series data $U_{obj}(t)$ of the complex amplitude image of the object light can be obtained from Formula (5c) or Formula (5d).

In order to prevent the frequency range of $I_{cross}(t)$ or $I_{cross}^*(t)$ from overlapping with the frequency range of $I_{obj}(t)$, it is necessary to set the heterodyne frequency $f_0$ to $f_0 \geq 3\Delta f_{max}$. In addition, when $f_0 = 3\Delta f_{max}$, the maximum frequency of the time series data I(t) of the intensity image of the interference light is $4\Delta f_{max}$. Therefore, from the Nyquist sampling theorem, when the time series data I(t) of the intensity image of the interference light is acquired by the imaging unit 50 at a frame rate of twice the maximum frequency ($8\Delta f_{max}$), the time series data $U_{obj}(t)$ of the complex amplitude image of the object light can be reproduced with high accuracy.

In the observation apparatus and the observation method described below, the frame rate when the imaging unit 50 acquires the time series data I(t) of the intensity image of the interference light can be made lower than $8\Delta f_{max}$ by improving the content of processing by the analysis unit 60.

A function β(t) represented by the following Formula (6) is defined using the time series data $U_{obj}(t)$ of the complex amplitude image of the object light on the imaging plane of the imaging unit 50 and the time series data $U_{ref}(t)$ of the complex amplitude image of the reference light on the imaging plane of the imaging unit 50. Further, a function χ(t) represented by the following Formula (7) is defined using the function β(t).

[Formula 6]

$$\beta(t) = \frac{U_{obj}(t)}{U_{ref}(t)} \quad (6)$$

[Formula 7]

$$\chi(t) = \log[1 + \beta(t)] \quad (7)$$

Re[χ(t)] being a real part of the function χ(t) is represented by the following Formula (8). As shown in Formula (8), Re[χ(t)] can be obtained based on the time series data I(t) of the intensity image of the interference light on the imaging plane of the imaging unit 50 and the time series data $I_{ref}(t)$ of the intensity image of the reference light on the imaging plane of the imaging unit 50. Since both I(t) and $I_{ref}(t)$ can be measured, Re[χ(t)] can be obtained from the measured values.

[Formula 8]

$$\operatorname{Re}[\chi(t)] = \log|1 + \beta(t)| \quad (8)$$
$$= \log\left|1 + \frac{U_{obj}(t)}{U_{ref}(t)}\right|$$
$$= \frac{1}{2} \cdot \log\left|\frac{U_{obj}(t) + U_{ref}(t)}{U_{ref}(t)}\right|^2$$
$$= \frac{1}{2}\{\log I(t) - \log I_{ref}(t)\}$$

The time series data $I_{ref}(t)$ of the intensity image of the reference light can be measured, for example, by inserting the shield 36 on the optical path of the object light in the interference optical system as illustrated in FIG. 2 before or after the measurement so that only the reference light out of the object light and the reference light reaches the imaging plane of the imaging unit 50, when the data does not change with time during and before and after the measurement. In addition, in Formula (8), the intensity image of the reference light corresponding to the time series data I(t) of the intensity image of the interference light is referred to as the time series data $I_{ref}(t)$ of the intensity image of the reference light which does not change with time.

Figure 3:
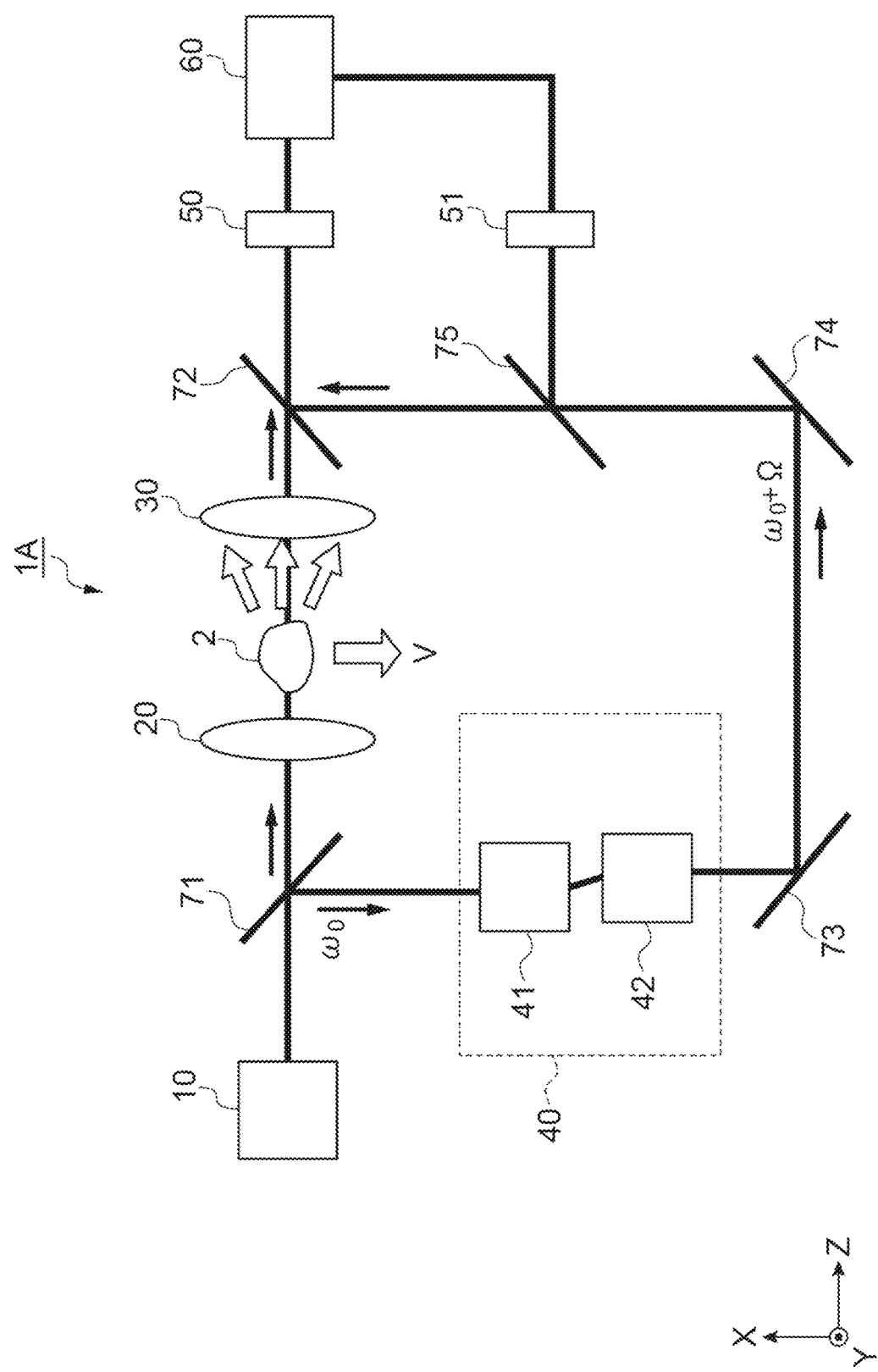
FIG. 3 is a diagram illustrating a configuration of an observation apparatus 1A of a modification.

Further, when the time series data $I_{ref}(t)$ of the intensity image of the reference light changes with time, for example, as in a configuration of an observation apparatus 1A illustrated in FIG. 3, a beam splitter 75 may be provided on the optical path of the reference light in the interference optical system, a part of the reference light may be split and extracted by the beam splitter 75, and the time series data $I_{ref}(t)$ of the intensity image of the extracted reference light may be acquired by another second imaging unit 51.

The time series data $I_{ref}(t)$ of the intensity image of the reference light acquired by the second imaging unit 51 may be equal to the time series data $I_{ref}(t)$ of the intensity image of the reference light acquired by the imaging unit 50 when only the reference light reaches the imaging unit 50. The second imaging unit 51 may have a configuration similar to that of the imaging unit 50.

Im[χ(t)] being an imaginary part of the function χ(t) and Re[χ(t)] described above have a relationship represented by the Kramers-Kronig relations (hereinafter referred to as the "KK relations") of the following Formula (9) and Formula (10). Therefore, by using Formula (10), Im[χ(t)] can be obtained from Re[χ(t)]. Thus, since the function χ(t) can be obtained, the time series data $U_{obj}(t)$ of the complex amplitude image of the object light can be obtained from the function χ(t) using Formula (6) and Formula (7).

[Formula 9]

$$\operatorname{Re}[\chi(t)] = \frac{1}{\pi} p.v. \int_{-\infty}^{\infty} \frac{\operatorname{Im}[\chi(t')]}{t' - t} dt' \quad (9)$$

[Formula 10]

$$\operatorname{Im}[\chi(t)] = -\frac{1}{\pi} p.v. \int_{-\infty}^{\infty} \frac{\operatorname{Re}[\chi(t')]}{t' - t} dt' \quad (10)$$

In addition, it will be described that Re[χ(t)] and Im[χ(t)] have the relationship represented by the above Formula (9) and Formula (10). When β(t) satisfies the following Formula (11), χ(t) can be Taylor-expanded as in the following Formula (12). That is, χ(t) can be expanded by a Dower of β(t).

[Formula 11]

$$|\beta(t)| < 1 \quad (11)$$

[Formula 12]

$$\chi(t) = \sum_{n=0}^{\infty} \frac{(-1)^n}{n+1} \beta(t)^{n+1} \quad (12)$$

In order to satisfy the above Formula (11), a transmittance and a reflectance of the beam splitter 71 or the beam splitter 72 may be set to appropriate values. Further, in order to satisfy the above Formula (11), as illustrated in FIG. 2, the object light may be attenuated by the neutral density filter 35 provided on the optical path of the object light in the interference optical system. The neutral density filter 35 is preferably provided on the optical path where the object light is collimated (for example, between the lens 32 and the lens 33 or between the beam splitter 71 and the lens 21).

In general, the convolution theorem holds for two functions $f_1(t)$ and $f_2(t)$. That is, when a Fourier transform of $f_1(t)$ is set to $F_1(\omega)$ and a Fourier transform of $f_2(t)$ is set to $F_2(\omega)$, a product of $f_1(t)$ and $f_2(t)$ is equal to a Fourier transform of convolution of $F_1(\omega)$ and $F_2(\omega)$.

From the convolution theorem and the above Formula (12), when the Fourier transform $B(\omega)$ of $\beta(t)$ satisfies $B(\omega<0)=0$, the Fourier transform $X(\omega)$ of $\chi(t)$ satisfies $X(\omega<0)=0$. That is, when $B(\omega)=0$ in the range of $\omega<0$, $X(\omega)=0$ in the range of $\omega<0$. The inverse Fourier transform of the function $X(\omega)$ satisfying $X(\omega<0)=0$ is $\chi(t)$, and thus, Re[χ(t)] and Im[χ(t)] have the relationship of the KK relations represented by the above Formula (9) and Formula (10).

In order to satisfy $B(\omega<0)=0$, the heterodyne frequency $f_0$ set by the modulation unit 40 may be set to $\Delta f_{max}$ or more. That is, as can be seen from the above Formula (6), when the frequency range $[-\Delta f_{max}, \Delta f_{max}]$ of $U_{obj}(t)$ is shifted by the heterodyne frequency $f_0$ of $U_{ref}(t)$, a negative frequency component may not be present after the shift.

When $f_0$ is set to less than $3\Delta f_{max}$, the imaging unit 50 acquires the time series data I(t) of the intensity image of the interference light at a frame rate lower than that in the conventional art, and the time series data $U_{obj}(t)$ of the complex amplitude image of the object light can be reproduced with high accuracy. For example, when $f_0=\Delta f_{max}$, the maximum frequency of the time series data I(t) of the intensity image of the interference light is $2\Delta f_{max}$, and thus, the frame rate of the imaging unit 50 may be $4\Delta f_{max}$. This is one half of the frame rate conventionally required.

In addition, for each of I(t) and $I_{ref}(t)$ acquired by the imaging unit 50, it is preferable to perform a Fourier transform, a padding process of enlarging a frequency domain after the Fourier transform and giving a predetermined value (for example, 0) to the enlarged domain, and an inverse Fourier transform after the padding process, and use the data after these processes in Formula (8).

Further, for $U_{obj}(t)$ obtained from χ(t), it is preferable to perform a Fourier transform, a cropping process for extracting a part of a frequency domain after the Fourier transform, and an inverse Fourier transform after the cropping process, and use the data after these processes in subsequent processes.

Figure 4:
FIG. 4 is a diagram showing a real part of an original image.
Figure 5:
FIG. 5 is a diagram showing an imaginary part of the original image.

Next, simulation results will be described. In this case, the configuration of the observation apparatus illustrated in FIG. 1 and FIG. 2 is assumed, and an original image (FIG. 4 and FIG. 5) parallel to the xy plane is moved in the x axis direction. The maximum value $\Delta f_{max}$ of the Doppler shift amount of the object light reaching the imaging plane of the imaging unit 50 is set to 40 kHz, and the heterodyne frequency $f_0$ by the modulation unit 40 is also set to 40 kHz. FIG. 4 is a diagram showing the real part of the original image, and FIG. 5 is a diagram showing the imaginary part of the original image. The number of pixels of the original image is 256×512.

Figure 6:
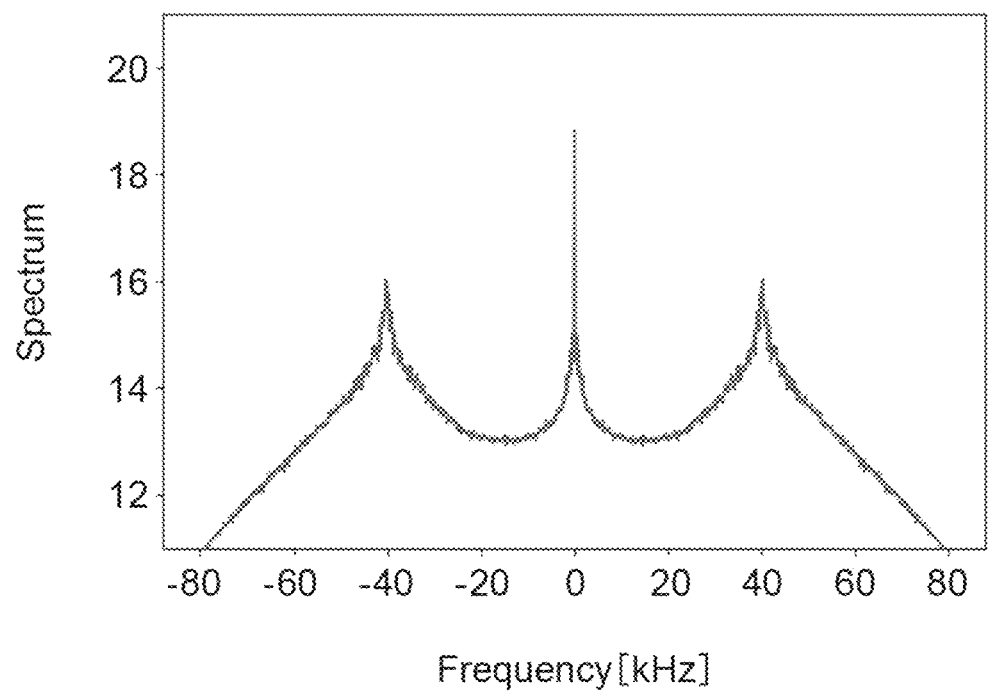
FIG. 6 is a diagram showing a frequency distribution of an intensity image $I(t)$ of interference light on an imaging plane of an imaging unit 50.
Figure 7:
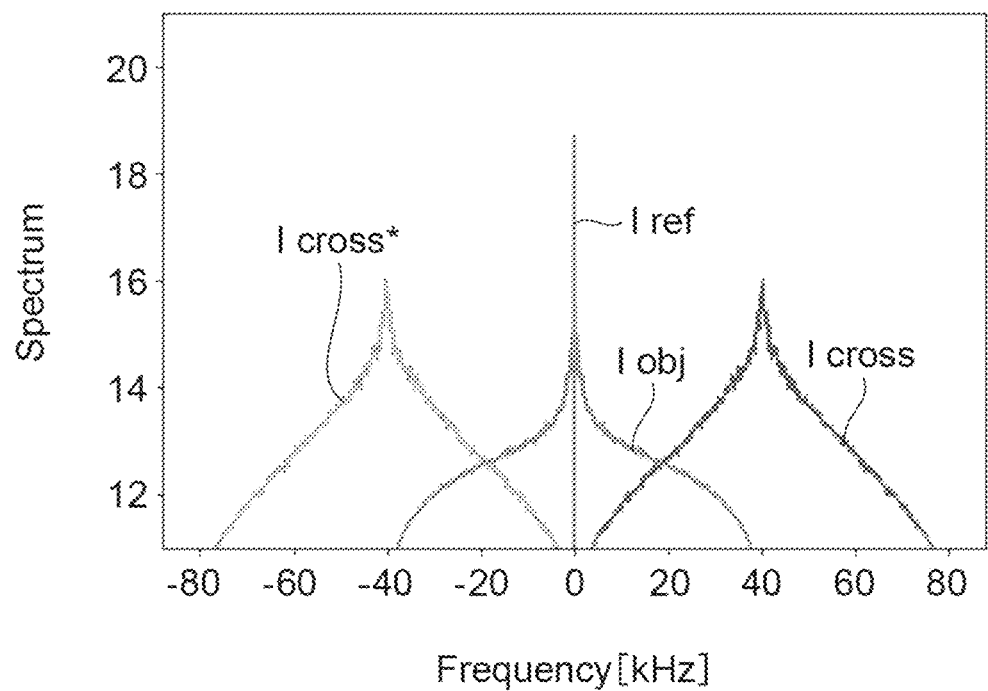
FIG. 7 is a diagram showing frequency distributions of $I_{obj}(t)$, $I_{ref}(t)$, $I_{cross}(t)$, and $I_{cross}*(t)$ on the imaging plane of the imaging unit 50.

FIG. 6 is a diagram showing a frequency distribution of the intensity image I(t) of the interference light on the imaging plane of the imaging unit 50. FIG. 7 is a diagram showing respective frequency distributions of $I_{obj}(t)$, $I_{ref}(t)$, $I_{cross}(t)$, and $I_{cross}^*(t)$ on the imaging plane of the imaging unit 50.

$I_{obj}(t)$ includes frequency components in a range of [−80 kHz, 80 kHz] and has a peak at a frequency position of 0 kHz. The frequency distribution of $I_{ref}(t)$ is constant with time and includes only DC components.

$I_{cross}(t)$ includes frequency components in a range of [0 kHz, 80 kHz] and has a peak at a frequency position of 40 kHz. $I_{cross}^*(t)$ includes frequency components in a range of [−80 kHz, 0 kHz] and has a peak at a frequency position of −40 kHz. The frequency range of each of $I_{cross}(t)$ and $I_{cross}^*(t)$ overlaps with the frequency range of $I_{obj}(t)$. Therefore, $I_{cross}(t)$ and $I_{cross}^*(t)$ cannot be measured separately from $I_{obj}(t)$.

Figure 8:
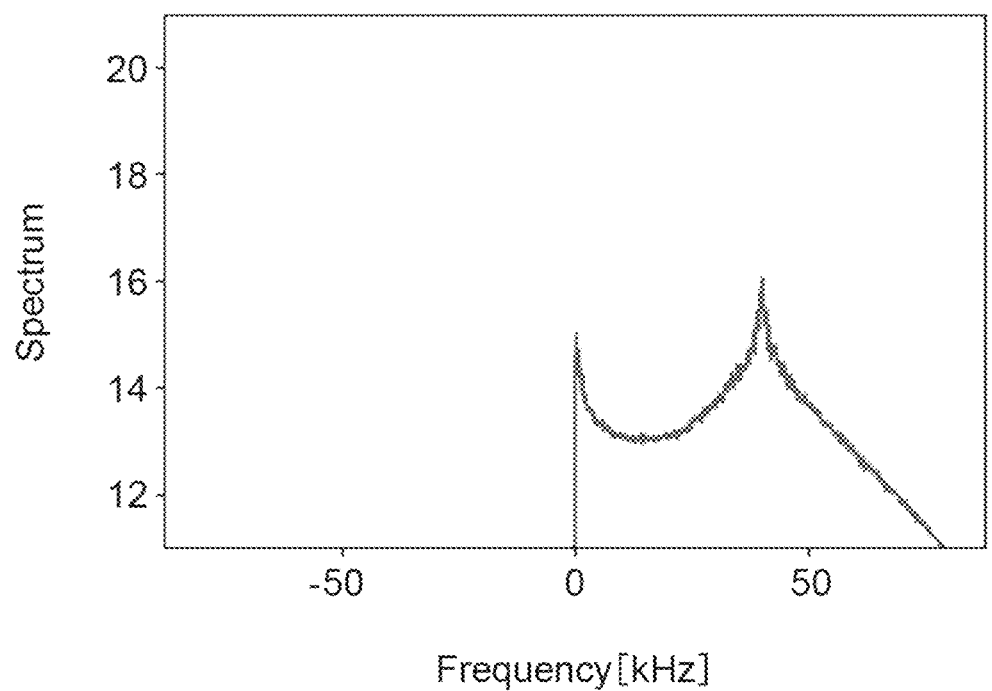
FIG. 8 is a diagram showing a frequency distribution of $I_{cross}(t)$ obtained by a conventional example of extracting a frequency range of [0 kHz, 80 kHz] from FIG. 6.
Figure 9:
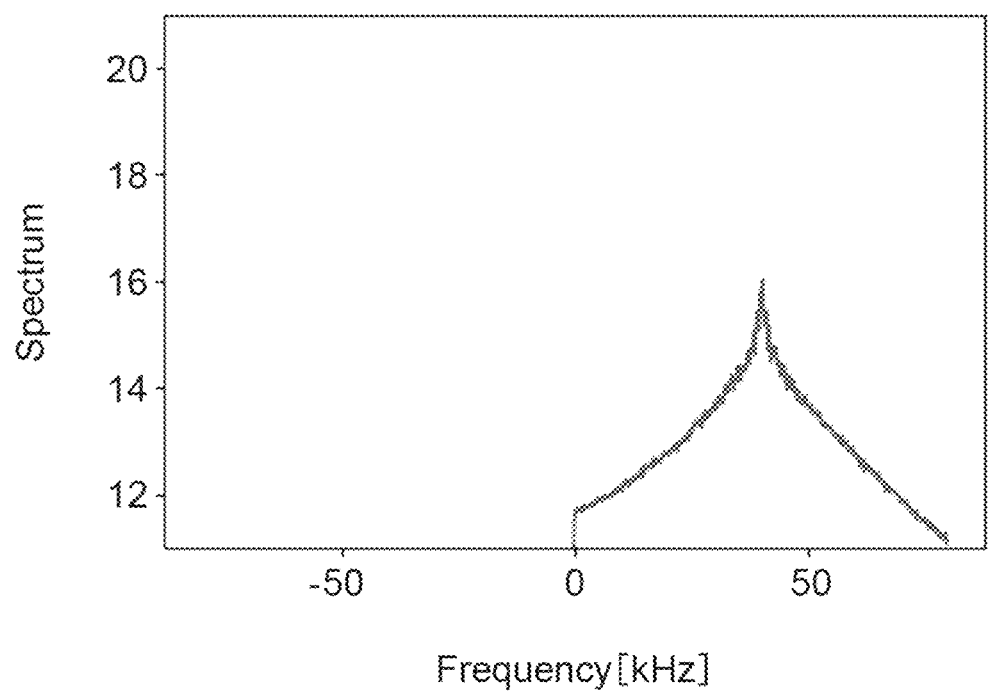
FIG. 9 is a diagram showing a frequency distribution of $I_{cross}(t)$ obtained by an example using the KK relations.

FIG. 8 is a diagram showing a frequency distribution of $I_{cross}(t)$ obtained by a conventional example of extracting a frequency range of [0 kHz, 80 kHz] from FIG. 6. FIG. 9 is a diagram showing a frequency distribution of $I_{cross}(t)$ obtained by an example using the KK relations. In the conventional example, the frequency distribution of $I_{obj}(t)$ is superimposed on the original frequency distribution of $I_{cross}(t)$. On the other hand, in the example, there is no influence of the frequency distribution of $I_{obj}(t)$, and the original frequency distribution of $I_{cross}(t)$ is obtained.

Figure 10:
FIG. 10 is a diagram showing an image of an exact solution.
Figure 11:
FIG. 11 is a diagram showing an image obtained by the conventional example.
Figure 12:
FIG. 12 is a diagram showing an image obtained by the example.

FIG. 10 is a diagram showing an image of an exact solution. FIG. 11 is a diagram showing an image obtained by the conventional example. FIG. 12 is a diagram showing an image obtained by the example. Each image in FIG. 10 to FIG. 12 is the real part of the complex amplitude image obtained when the irradiation direction of the object light to the original image by the irradiation optical system 20 is set to 34° with respect to the z axis.

Figure 13:
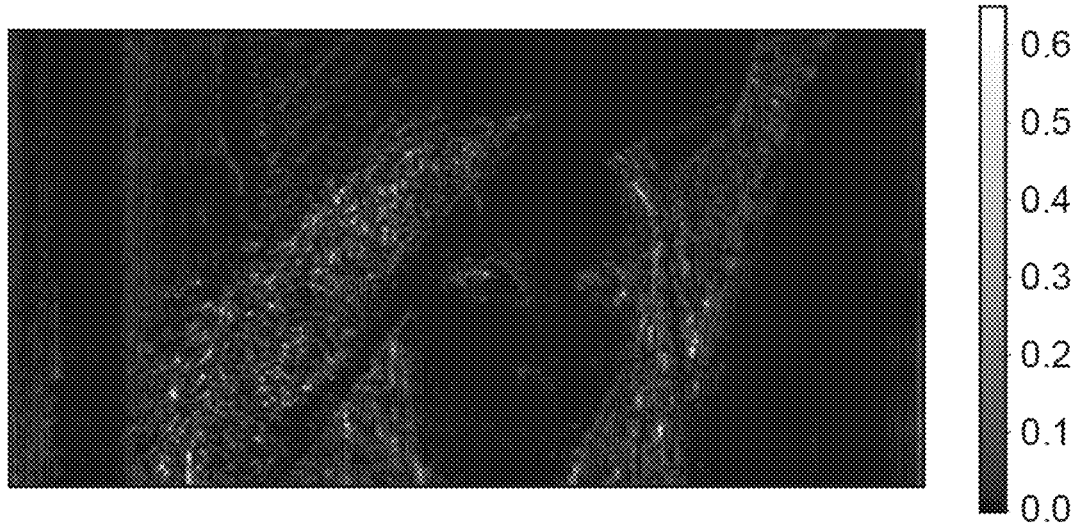
FIG. 13 is a diagram showing a difference between a complex amplitude image obtained by the conventional example and the image of the exact solution.
Figure 14:
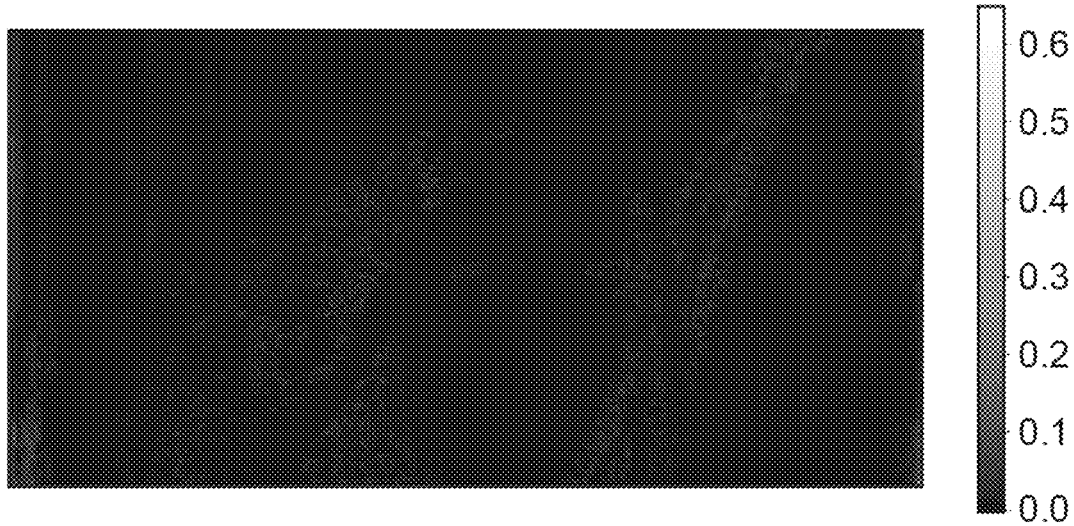
FIG. 14 is a diagram showing a difference between a complex amplitude image obtained by the example and the image of the exact solution.

FIG. 13 is a diagram showing a difference between the complex amplitude image obtained by the conventional example and the image of the exact solution. FIG. 14 is a diagram showing a difference between the complex amplitude image obtained by the example and the image of the exact solution. Each image in FIG. 13 and FIG. 14 is an image of a square of an absolute value of the difference between the two images. In the conventional example, an error is large. On the other hand, there is almost no error in the example.

As described above, according to the present embodiment, when observing the moving observation object, a camera whose frame rate is lower than that of the conventional method can be used as the imaging unit. For example, according to the present embodiment, it is possible to obtain equivalent information (image quality) at a frame rate of ½ compared to the conventional method.

Therefore, image data obtained by imaging can be reduced, a capacity of a storage unit necessary for storing data can be reduced, and a load of data processing can be reduced. Further, an inexpensive camera can be used as the imaging unit. In addition, when a high-speed camera required in the conventional method is used as the imaging unit, a throughput (number/second) of the observation of the observation object can be improved by two times, and the number of sample records per one apparatus can be improved by two times.

The observation apparatus and the observation method are not limited to the embodiments and configuration examples described above, and various other modifications are possible.

The observation apparatus of the above embodiment includes (1) a light source for outputting light; (2) an interference optical system for splitting the light output from the light source into object light and reference light, and combining and outputting the object light passed through a moving observation object and the reference light; (3) a modulation unit provided on an optical path of the object light or the reference light from splitting to combining in the interference optical system, and for shifting an optical frequency of the object light or the reference light by a heterodyne frequency $f_0$; (4) an imaging unit having an imaging plane disposed at a position where an image of the observation object is formed by the object light output from the interference optical system, and for acquiring an intensity image of interference light by the object light and the reference light output from the interference optical system and reaching the imaging plane; and (5) an analysis unit for obtaining time series data of a complex amplitude image of the object light on the imaging plane based on time series data of the intensity image of the interference light on the imaging plane, and when a maximum value of a Doppler shift amount of the optical frequency based on interaction with the observation object in the object light reaching the imaging plane is set to $\Delta f_{max}$, the modulation unit sets the heterodyne frequency $f_0$ to $\Delta f_{max}$ or more, and the analysis unit (a) obtains a real part of a function $\chi(t)=\log[1+U_{obj}(t)/U_{ref}(t)]$, defined by time series data $U_{obj}(t)$ of the complex amplitude image of the object light on the imaging plane and time series data $U_{ref}(t)$ of the complex amplitude image of the reference light on the imaging plane, based on time series data I(t) of the intensity image of the interference light on the imaging plane and time series data $I_{ref}(t)$ of the intensity image of the reference light on the imaging plane, (b) obtains an imaginary part of the function $\chi(t)$ from the real part of the function $\chi(t)$ using Kramers-Kronig relations, and (c) obtains the time series data $U_{obj}(t)$ of the complex amplitude image of the object light on the imaging plane based on the function $\chi(t)$.

The observation method of the above embodiment uses the light source; the interference optical system; the modulation unit; and the imaging unit of the above configuration, and the method includes (a) when a maximum value of a Doppler shift amount of the optical frequency based on interaction with the observation object in the object light reaching the imaging plane is set to $\Delta f_{max}$, setting the heterodyne frequency $f_0$ to $\Delta f_{max}$ or more by the modulation unit, and obtaining time series data of the intensity image of the interference light on the imaging plane by the imaging unit; (b) obtaining a real part of a function $\chi(t)=\log[1+U_{obj}(t)/U_{ref}(t)]$, defined by time series data $U_{obj}(t)$ of the complex amplitude image of the object light on the imaging plane and time series data $U_{ref}(t)$ of the complex amplitude image of the reference light on the imaging plane, based on time series data I(t) of the intensity image of the interference light on the imaging plane and time series data $I_{ref}(t)$ of the intensity image of the reference light on the imaging plane; (c) obtaining an imaginary part of the function $\chi(t)$ from the real part of the function $\chi(t)$ using Kramers-Kronig relations; and (d) obtaining the time series data $U_{obj}(t)$ of the complex amplitude image of the object light on the imaging plane based on the function χ(t).

In the above observation apparatus and the observation method, the heterodyne frequency $f_0$ may be set to less than $3\Delta f_{max}$ in the modulation unit.

In the above observation apparatus and the observation method, the interference optical system may include (1) an irradiation optical system for, when irradiating the observation object with the object light, focusing the object light and irradiating a line-shaped region in a direction perpendicular to a moving direction of the observation object with the object light; and (2) an imaging optical system for, when forming the image of the observation object by the object light emitted from the observation object on the imaging plane, setting a positional relationship of Fourier transform between the observation object and the imaging plane in a direction parallel to the moving direction of the observation object, and setting a positional relationship conjugate to each other between the observation object and the imaging plane in a direction perpendicular to the moving direction of the observation object, and the analysis unit may obtain the complex amplitude image for each irradiation direction of the object light to the observation object by the irradiation optical system, and may acquire a three-dimensional distribution of a refractive index of the observation object.

In the above observation apparatus, the analysis unit may obtain the real part of the function χ(t) using the intensity image of the reference light acquired when only the reference light out of the object light and the reference light reaches the imaging plane of the imaging unit in a state where a shield is placed on the optical path of the object light in the interference optical system.

In the above observation method, the real part of the function χ(t) may be obtained using the intensity image of the reference light acquired when only the reference light out of the object light and the reference light reaches the imaging plane of the imaging unit in a state where a shield is placed on the optical path of the object light in the interference optical system.

The above observation apparatus may further include a beam splitter provided on the optical path of the reference light in the interference optical system, and for splitting and extracting a part of the reference light; and a second imaging unit for acquiring the intensity image of the reference light extracted by the beam splitter, and the analysis unit may obtain the real part of the function χ(t) using the time series data $I_{ref}(t)$ of the intensity image of the reference light acquired by the second imaging unit.

The above observation method may further use a beam splitter provided on the optical path of the reference light in the interference optical system, and for splitting and extracting a part of the reference light; and a second imaging unit for acquiring the intensity image of the reference light extracted by the beam splitter, and the real part of the function χ(t) may be obtained using the time series data $I_{ref}(t)$ of the intensity image of the reference light acquired by the second imaging unit.

INDUSTRIAL APPLICABILITY

The embodiments can be used as an observation apparatus and an observation method capable of using a low-speed camera as an imaging unit when observing a moving observation object.

REFERENCE SIGNS LIST 1, 1A—observation apparatus, 2—observation object, 10—light source unit, 20—irradiation optical system, 21, 22—lens, 30—imaging optical system, 31—34—lens, 35—neutral density filter, 36—shield, 40—modulation unit, 41, 42—acousto-optic element, 50, 51—imaging unit, 60—analysis unit, 71, 72—beam splitter, 73, 74—mirror, 75—beam splitter.

The invention claimed is:

1. An observation apparatus comprising:
a light source configured to output light;
an interference optical system configured to split the light output from the light source into object light and reference light, and combine and output the object light passed through a moving observation object and the reference light;
a modulator provided on an optical path of the object light or the reference light from splitting to combining in the interference optical system, and configured to shift an optical frequency of the object light or the reference light by a heterodyne frequency $f_0$;
an imager having an imaging plane disposed at a position where an image of the observation object is formed by the object light output from the interference optical system, and configured to acquire an intensity image of interference light by the object light and the reference light output from the interference optical system and reaching the imaging plane; and
an analyzer configured to obtain time series data of a complex amplitude image of the object light on the imaging plane based on time series data of the intensity image of the interference light on the imaging plane, wherein
when a maximum value of a Doppler shift amount of the optical frequency based on interaction with the observation object in the object light reaching the imaging plane is set to $\Delta f_{max}$, the modulator is configured to set the heterodyne frequency $f_0$ to $\Delta f_{max}$ or more, and
the analyzer is configured to
obtain a real part of a function $\chi(t)=\log[1+U_{obj}(t)/U_{ref}(t)]$, defined by time series data $U_{obj}(t)$ of the complex amplitude image of the object light on the imaging plane and time series data $U_{ref}(t)$ of the complex amplitude image of the reference light on the imaging plane, based on time series data $I(t)$ of the intensity image of the interference light on the imaging plane and time series data $I_{ref}(t)$ of the intensity image of the reference light on the imaging plane,
obtain an imaginary part of the function χ(t) from the real part of the function χ(t) using Kramers-Kronig relations, and
obtain the time series data $U_{obj}(t)$ of the complex amplitude image of the object light on the imaging plane based on the function χ(t), wherein
the imager acquires the time series data I(t) of the intensity image of the interference light,
a frame rate of the imager is made lower than $8 \Delta f_{max}$ by improving a content of processing by the analyzer when the imager acquires the time series data I(t) of the intensity image of the interference light, and
the imager acquires an new intensity image of interference light by the object light and the reference light output from the interference optical system and reaching the imaging plane at the frame rate lower than $8 \Delta f_{max}$ based on the acquired time series data I(t) of the intensity image of the interference light.

2. The observation apparatus according to claim 1, wherein the modulator is configured to set the heterodyne frequency $f_0$ to less than $3 \Delta f_{max}$.

3. The observation apparatus according to claim 1, wherein the interference optical system includes:
an irradiation optical system configured to, when irradiating the observation object with the object light, focus the object light and irradiate a line-shaped region in a direction perpendicular to a moving direction of the observation object with the object light; and
an imaging optical system configured to, when forming the image of the observation object by the object light emitted from the observation object on the imaging plane, set a positional relationship of Fourier transform between the observation object and the imaging plane in a direction parallel to the moving direction of the observation object, and set a positional relationship conjugate to each other between the observation object and the imaging plane in a direction perpendicular to the moving direction of the observation object, wherein
the analyzer is configured to obtain the complex amplitude image for each irradiation direction of the object light to the observation object by the irradiation optical system, and acquire a three-dimensional distribution of a refractive index of the observation object.

4. The observation apparatus according to claim 1, wherein the analyzer is configured to obtain the real part of the function $\chi(t)$ using the intensity image of the reference light acquired when only the reference light out of the object light and the reference light reaches the imaging plane of the imager in a state where a shield is placed on the optical path of the object light in the interference optical system.

5. The observation apparatus according to claim 1, further comprising a beam splitter provided on the optical path of the reference light in the interference optical system, and configured to split and extract a part of the reference light; and a second imager configured to acquire the intensity image of the reference light extracted by the beam splitter, wherein the analyzer is configured to obtain the real part of the function $\chi(t)$ using the time series data $I_{ref}(t)$ of the intensity image of the reference light acquired by the second imager.

6. An observation method using:
a light source configured to output light;
an interference optical system configured to split the light output from the light source into object light and reference light, and combine and output the object light passed through a moving observation object and the reference light;
a modulator provided on an optical path of the object light or the reference light from splitting to combining in the interference optical system, and configured to shift an optical frequency of the object light or the reference light by a heterodyne frequency $f_0$; and
an imager having an imaging plane disposed at a position where an image of the observation object is formed by the object light output from the interference optical system, and configured to acquire an intensity image of interference light by the object light and the reference light output from the interference optical system and reaching the imaging plane, wherein the method comprises:
setting a maximum value of a Doppler shift amount of the optical frequency to $\Delta f_{max}$ based on interaction with the observation object in the object light reaching the imaging plane,
setting the heterodyne frequency $f_0$ to $\Delta f_{max}$ or more by the modulator when the maximum value of the Doppler shift amount of the optical frequency is set to $\Delta f_{max}$;
obtaining time series data of the intensity image of the interference light on the imaging plane by the imager when the maximum value of the Doppler shift amount of the optical frequency is set to $\Delta f_{max}$;
obtaining a real part of a function $\chi(t)=\log[1+U_{obj}(t)/U_{ref}(t)]$, defined by time series data $U_{obj}(t)$ of the complex amplitude image of the object light on the imaging plane and time series data $U_{ref}(t)$ of the complex amplitude image of the reference light on the imaging plane, based on time series data $I(t)$ of the intensity image of the interference light on the imaging plane and time series data $I_{ref}(t)$ of the intensity image of the reference light on the imaging plane;
obtaining an imaginary part of the function $\chi(t)$ from the real part of the function $\chi(t)$ using Kramers-Kronig relations; and
obtaining the time series data $U_{obj}(t)$ of the complex amplitude image of the object light on the imaging plane based on the function $\chi(t)$, wherein
the imager acquires the time series data $I(t)$ of the intensity image of the interference light,
a frame rate of the imager is made lower than 8 $\Delta f_{max}$ by improving a content of processing by the analyzer when the imager acquires the time series data $I(t)$ of the intensity image of the interference light, and
the imager acquires an new intensity image of interference light by the object light and the reference light output from the interference optical system and reaching the imaging plane at the frame rate lower than 8 $\Delta f_{max}$ based on the acquired time series data $I(t)$ of the intensity image of the interference light.

7. The observation method according to claim 6, wherein the heterodyne frequency $f_0$ is set to less than 3 $\Delta f_{max}$ by the modulator.

8. The observation method according to claim 6, wherein the interference optical system includes:
an irradiation optical system configured to, when irradiating the observation object with the object light, focus the object light and irradiate a line-shaped region in a direction perpendicular to a moving direction of the observation object with the object light; and
an imaging optical system configured to, when forming the image of the observation object by the object light emitted from the observation object on the imaging plane, set a positional relationship of Fourier transform between the observation object and the imaging plane in a direction parallel to the moving direction of the observation object, and set a positional relationship conjugate to each other between the observation object and the imaging plane in a direction perpendicular to the moving direction of the observation object, wherein
the complex amplitude image is obtained for each irradiation direction of the object light to the observation object by the irradiation optical system, and a three-dimensional distribution of a refractive index of the observation object is acquired.

9. The observation method according to claim 6, wherein the real part of the function $\chi(t)$ is obtained using the intensity image of the reference light acquired when only the reference light out of the object light and the reference light reaches the imaging plane of the imager in a state where a shield is placed on the optical path of the object light in the interference optical system.

10. The observation method according to claim 6, further using a beam splitter provided on the optical path of the reference light in the interference optical system, and configured to split and extract a part of the reference light; and a second imager configured to acquire the intensity image of the reference light extracted by the beam splitter, wherein the real part of the function $\chi(t)$ is obtained using the time series data $I_{ref}(t)$ of the intensity image of the reference light acquired by the second imager.

* * * * *